(12) United States Patent
Jeong (10) Patent No.: US 11,431,260 B2
(45) Date of Patent: Aug. 30, 2022

(54) RECTIFICATION DEVICE HAVING STANDBY POWER REDUCTION FUNCTION

(71) Applicant: Tae Jun Yoon, Yongin-si (KR)

(72) Inventor: Yeon Moon Jeong, Yongin-si (KR)

(73) Assignee: Yeon Moon Jeong, Yongin-si (KR)

( * ) Notice: Subject to any disclaimer, the term of this patent is extended or adjusted under 35 U.S.C. 154(b) by 102 days.

(21) Appl. No.: 16/771,440

(22) PCT Filed: Feb. 21, 2018

(86) PCT No.: PCT/KR2018/002143
§ 371 (c)(1),
(2) Date: Jun. 10, 2020

(87) PCT Pub. No.: WO2019/164026
PCT Pub. Date: Aug. 29, 2019

(65) Prior Publication Data
US 2021/0075322 A1 Mar. 11, 2021

(51) Int. Cl.
*H02M 7/155* (2006.01)
*H02M 1/14* (2006.01)
(Continued)

(52) U.S. Cl.
CPC ............ *H02M 7/155* (2013.01); *H02M 1/14* (2013.01); *H02M 1/007* (2021.05); *H02M 3/1582* (2013.01)

(58) Field of Classification Search
CPC ........ H02M 7/155; H02M 7/162; H02M 7/04; H02M 7/217; H02M 7/12; H02M 1/14;
(Continued)

(56) References Cited

U.S. PATENT DOCUMENTS 6,421,263 B1 * 7/2002 Shinkawa ............. H02J 7/1415
363/132
9,755,456 B1 * 9/2017 Peterson ................. H02J 50/12
(Continued)

FOREIGN PATENT DOCUMENTS

KR 10-2014-0045058 4/2014
KR 10-1564004 10/2015
(Continued)

OTHER PUBLICATIONS

International Search report, with English translation, corresponding to International Application No. PCT/KR2018/002143, dated Nov. 20, 2018.

*Primary Examiner* — Gustavo A Rosario-Benitez
(74) *Attorney, Agent, or Firm* — Kile Park Reed & Houtteman PLLC (57) ABSTRACT

Disclosed is a rectifying device provided with a standby power reduction function. When a voltage of unsmoothed DC power, which is output from a rectifying unit that rectifies AC power, is lowered to be equal to or smaller than a discharge reference voltage at a time around a zero-crossing point of the AC power, the present invention can instantaneously discharge a capacitor, which has been charged with the unsmoothed DC power, to be synthesized with the unsmoothed DC power, and thus supply stable DC power to a load without using an electrolytic capacitor. In particular, the present invention can adjust a resistance value of a surge prevention switch connected in series with the capacitor to control a current amount flowing through the capacitor, and thus can prevent a surge voltage from being generated when charging and discharging the capacitor.

10 Claims, 8 Drawing Sheets

(51) Int. Cl.
*H02M 1/00* (2006.01)
*H02M 3/158* (2006.01)

(58) Field of Classification Search
CPC .......... H02M 1/15; H02M 1/143; H02M 1/32; H02M 1/322
See application file for complete search history.

(56) References Cited

U.S. PATENT DOCUMENTS

| | | | | |
|---|---|---|---|---|
| 9,774,274 | B2* | 9/2017 | Lee | H02M 7/219 |
| 2002/0039298 | A1* | 4/2002 | Riggio | H02M 1/4258 363/22 |
| 2006/0132105 | A1* | 6/2006 | Prasad | H02M 1/4225 323/222 |
| 2008/0285316 | A1* | 11/2008 | Park | H02M 1/15 363/84 |
| 2012/0104859 | A1* | 5/2012 | Nii | B60L 53/22 363/126 |
| 2013/0195497 | A1* | 8/2013 | Shimura | H02M 1/36 399/88 |
| 2014/0173300 | A1* | 6/2014 | Yamazaki | H02J 7/007 713/300 |
| 2014/0184095 | A1* | 7/2014 | Yoshinaga | H02M 1/4225 315/291 |
| 2015/0366014 | A1* | 12/2015 | Itoh | H05B 45/3725 315/200 R |
| 2016/0359358 | A1 | 12/2016 | Jeong | |
| 2019/0020268 | A1* | 1/2019 | Saito | H02H 7/20 |
| 2019/0044439 | A1* | 2/2019 | Ohshima | H02M 7/12 |

FOREIGN PATENT DOCUMENTS

| | | |
|---|---|---|
| KR | 10-2017-0119366 | 10/2017 |
| KR | 10-1789936 | 10/2017 |

* cited by examiner

RECTIFICATION DEVICE HAVING STANDBY POWER REDUCTION FUNCTION

TECHNICAL FIELD

The present invention relates to a rectifying device, and more particularly, to a rectifying device having a standby power reduction function and converting AC power into DC power.

BACKGROUND ART

Since a voltage value of AC power supplied from a commercial power source is not constant, DC power can be stably used by smoothing AC to DC using a high voltage capacitor or the like in a procedure in which the AC power is converted to be used as the DC power.

In addition, a high voltage capacitor used for smoothing the DC has a reduced lifespan due to stress caused by the AC power, and the power factor thereof is not good because smoothing is performed by a simple method in which an AC voltage is rectified through a rectifier, and then, the rectified voltage is charged by the capacitor.

In particular, an aluminum electrolytic capacitor typically used for smoothing a high DC voltage has a large size and large internal resistance, and the inside thereof is made of an electrolyte. Accordingly, the capacitor is sensitive to a temperature change, and the lifespan is remarkably reduced at high and low temperatures.

Recently a DC conversion device is increasingly requested which can provide a function capable of not only always providing a constant DC voltage to a load, but also reducing standby power and controlling power through a direct communication. In addition, a DC conversion device with enhanced durability as well as a DC conversion device for the IoT with a miniaturized size and high efficiency is more expected.

A switching mode power supply (SMPS) is conventionally used for stably providing DC power required for an electronic product. However, when AC power is converted into DC power using the SMPS, smoothing is typically performed using an aluminum electrolytic capacitor so as to reduce ripples of an AC in 50 Hz or 60 Hz, and a booster is used for boosting a DC voltage and then smoothing is performed so as to improve the power factor. Accordingly, there occurs an issue in that a high voltage power stress is added to a circuit component and the SMPS does not continuously supply a stable DC power.

In addition, since the SMPS uses a large electrolytic capacitor in the internal circuit, the size of the DC conversion device also becomes large.

Furthermore, as IoT products are rapidly distributed, a function for performing a communication in an insulated state and turning a power source ON/OFF through the communication is increasingly required in order to secure electrical stability with another electronic terminal apparatus.

DISCLOSURE OF THE INVENTION

Technical Problem

The present invention provides a rectifying device capable of smoothing DC power rectified by a rectifier to provide a stable DC power without using an electrolytic capacitor that causes frequent failures, while preventing generation of a surge voltage.

The present invention also provides a rectifying device for performing bucking/boosting so that a required DC power is supplied to a load, and having an insulated communication function and a standby power control function.

Technical Solution

In accordance with an embodiment of the present invention, a rectifying device includes: a rectifying unit for rectifying AC power to output an unsmoothed DC power; a buck/boost circuit unit for receiving the DC power from an output terminal of the rectifying unit to boost or step down the DC power according to a control signal input from a main control unit, and providing the boosted or stepped down voltage to a load; a charging and discharging unit charged with the unsmoothed DC power, and for generating smoothed DC power by discharging the charged power to the output terminal of the rectifying unit to be overlapped with the unsmoothed DC power according to a discharge control signal input from the main control unit, when a voltage of the unsmoothed DC power is equal to or smaller than a reference voltage; a data receiving unit for receiving data from an external device to output the data to a shift register; the shift register for outputting an operation start signal, when the data input from the data receiving unit matches an operation start code; an operation switching unit for driving the charging and discharging unit and the main control unit, when the operation start signal is input; and the main control unit for controlling the buck/boost circuit unit to boost or step down the input DC power to output the boosted or stepped-down voltage to the load, receiving a zero crossing point of the AC power from the rectifying unit, outputting the discharge control signal to the charging and discharging unit to discharge the charging and discharging unit, when the unsmoothed DC voltage is equal to or smaller than a discharge reference voltage around the zero-crossing point.

The charging and discharging unit may include: a discharge switching unit including one or more discharge switches connected to the output terminal of the rectifying unit and to be turned on or off according to the discharge control signal; and a charging unit comprising: one or more capacitors connected in series to the one or more discharge switches, charged with the unsmoothed DC power, and discharged when the one or more discharge switches are turned on; and surge prevention switches respectively connected in series to the capacitors, and resistances of which are controlled according to a surge prevention signal input from the main control unit.

The main control unit may turn OFF the surge prevention switches to prevent a surge voltage from being generated, while a voltage or voltages across the one or more capacitors is or are equal to or greater than a surge prevention reference voltage.

The main control unit may prevent a surge voltage from being generated by increasing resistance values of the surge prevention switches in proportion to an amount that a voltage or voltages across the one or more capacitors exceeds or exceed the surge prevention reference voltage while a voltage or voltages across the one or more capacitors is equal to or greater than the surge prevention reference voltage.

The surge prevention switches may be implemented with triac switches, and the main control unit may output a voltage inversely proportional to an amount that the voltage or voltages across the one or more capacitors exceeds or exceed the surge prevention reference voltage, to the triac switches to increase resistance values of the surge prevention switches so as to prevent the surge voltage from being generated.

The operation switching unit may drive the charging and discharging unit and the main control unit by connecting an earth ground and an analog ground, when the operation start signal is input from the shift register.

The rectifying device may further include a power management unit for generating a driving voltage VDD using the DC power output from the rectifying unit, and outputting the driving voltage VDD to drive the shift register, the data receiving unit, and the main control unit.

The data receiving unit may be characterized by including: an oscillator driven according to data received from an external device to generate a signal corresponding to the received data; and a voltage multiplication circuit for amplifying the signal output from the oscillator to output the amplified signal to the shift register and the main control unit.

The main control unit may reset an average value of the discharge reference voltage value and a minimum voltage value of the output terminal, which is smaller than the discharge reference voltage, as the discharge reference voltage value, when the voltage of the output terminal of the rectifying unit falls below the discharge reference voltage right after outputting the discharge control signal to the charging and discharging unit to entirely discharge the power charged in the charging and discharging unit to the output terminal of the rectifying unit, and adjust a discharge timing so that discharging of the charging and discharging unit is performed at the reset discharge reference voltage value.

The main control unit may sense a current flowing through the load from a voltage across a resistor connected in series to the load, and stop the operation of the buck/boost circuit unit when an overcurrent flows to the load.

Advantageous Effects

According to the present invention, when an unsmoothed voltage of DC power, which is output from a rectifying unit that rectifies AC power, is lowered to be equal to or smaller than a discharge reference voltage at the time of being close to a zero crossing point of the AC power, a capacitor that has been charged with the unsmoothed DC power is instantaneously discharged to be synthesized with the unsmoothed DC power, and thus stable DC power can be supplied to a load without using an electrolytic capacitor.

In particular, the present invention adjusts a resistance value of a surge prevention switch connected in series with the capacitor to control a current amount flowing through the capacitor, and thus can prevent a surge voltage from being generated when charging and discharging the capacitor.

In addition, the present invention uses a data receiving unit and a data transmission unit, each including a voltage multiplication circuit including a high frequency oscillator, capacitors, or diodes, and thus, can transmit and receive data at low power consumption and also maintain an electrical insulation state from an external device to and from which the data is transmitted and received.

Furthermore, the present invention drives a data transmission unit and a data receiving unit with the high frequency oscillator, and thus can reduce standby power.

MODE FOR CARRYING OUT THE INVENTION

Hereinafter, it will be described in detail about an exemplary embodiment of the present invention in conjunction with the accompanying drawings.

Figure 1:
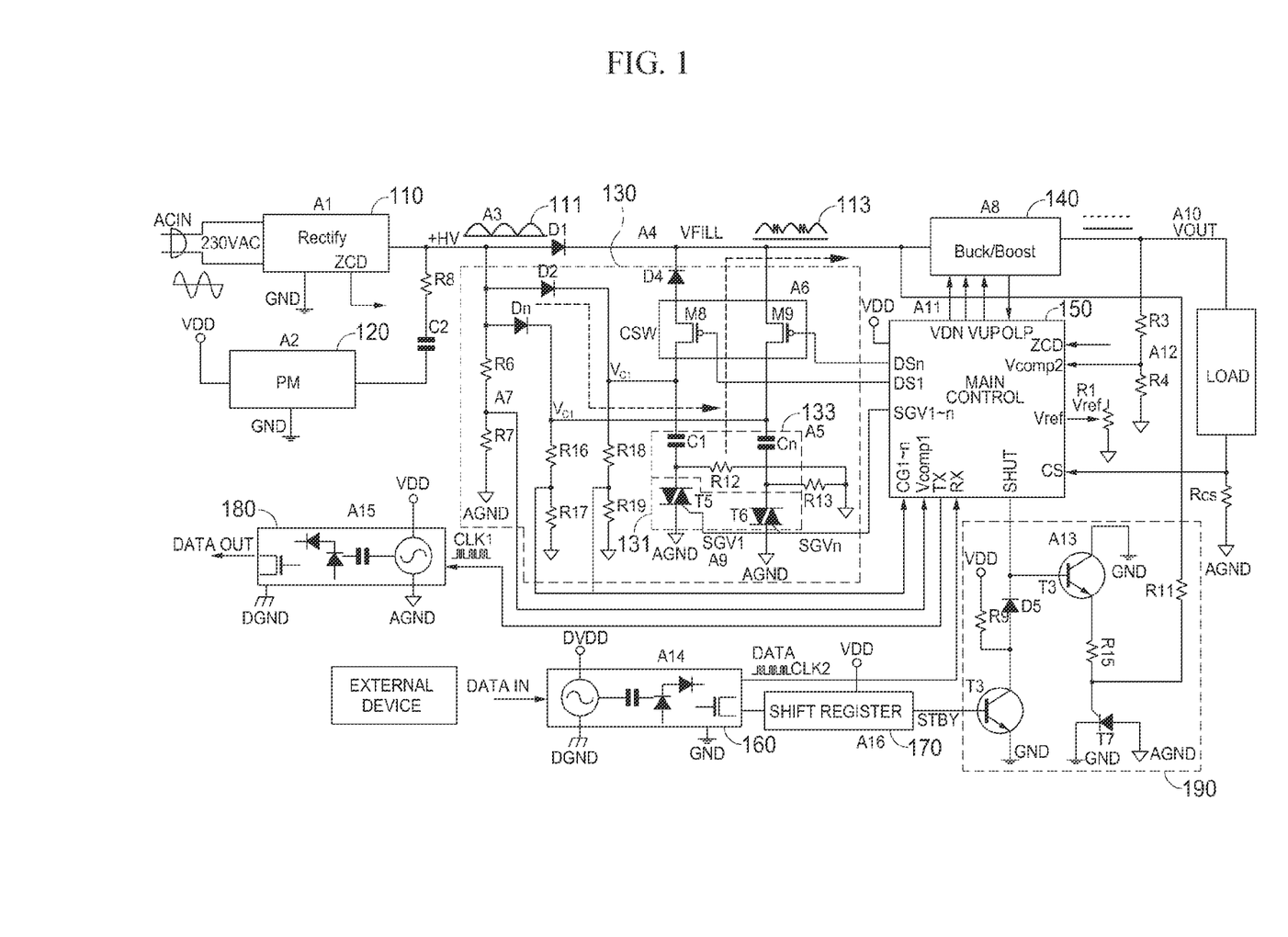
FIG. 1 is a circuit diagram illustrating the entire configuration of a rectifying device provided with a standby power reduction function according to a preferred embodiment of the present invention.
Figure 2:
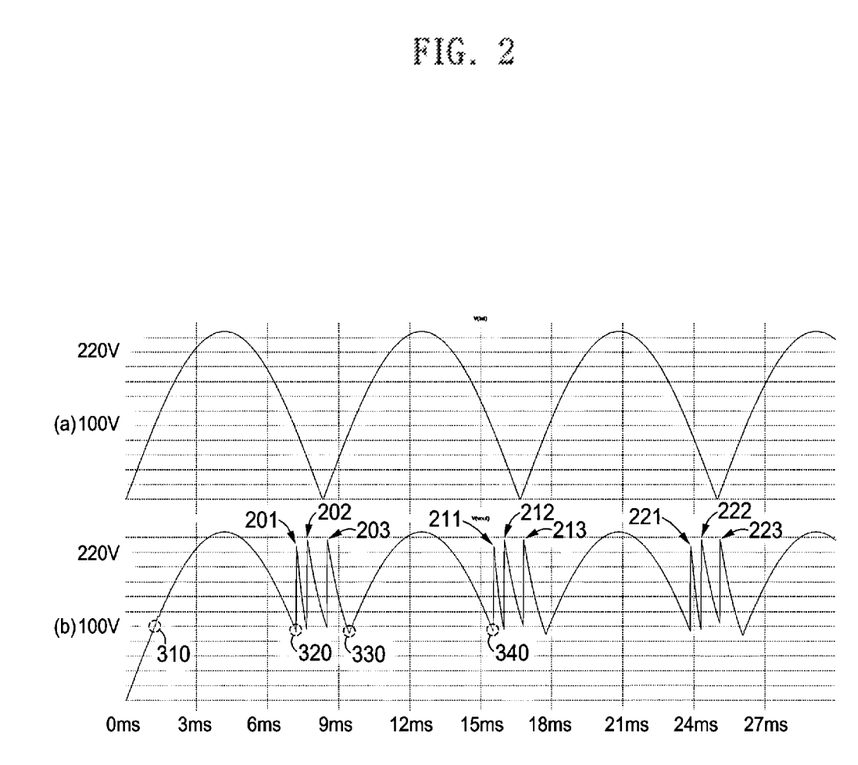
FIG. 2 illustrates a DC smoothing scheme according to a preferred embodiment of the present invention.

FIG. 1 is a circuit diagram illustrating the entire configuration of a rectifying device provided with a standby power reduction function according to a preferred embodiment of the present invention, and FIG. 2 illustrates a DC smoothing scheme according to a preferred embodiment of the present invention.

With reference to FIGS. 1 and 2, a rectifying device provided with a standby power reduction function includes a rectifying unit (Rectify) 110, a power management unit (PM) 120, a charging and discharging unit 130, a main control unit (MAIN CONTROL) 150, a buck/boost circuit unit (Buck/Boost) 140, a data receiving unit 160, a data transmission unit 180, a shift register 170, and an operation switching unit 190.

The rectifying unit 110 receives AC power from the commercial power source, rectifies the AC power to DC power, and then outputs an unsmoothed DC power (see 111 of FIG. 1 and (a) of FIG. 2). In addition, the rectifying unit 110 detects a zero crossing point of the input AC power to output a zero crossing signal ZCD indicating a zero crossing time point to the main control unit 150.

The power management unit 120 is connected to an output node of the rectifying unit 110, generates a driving voltage VDD for driving each component using the unsmoothed DC power output from the rectifying unit 110, and provides the driving voltage VDD to each component.

The charging and discharging unit 130 includes a discharging switching unit 131 and a charging unit 133.

As shown in FIG. 1, the charging unit 133 is composed in a structure in which one or more capacitors C1 and Cn are connected in parallel to each other, and surge prevention switches (e.g., triac switches T5 and T6), which can adjust an amount of the current flowing through each capacitor C1 and Cn are connected in series.

The charging unit 133 charges the internal capacitors C1 and Cn using the unsmoothed DC power output from the rectifying unit 110 through diodes D2 and Dn. Here, the surge prevention switches T5 and T6 are normally in an on state with resistances maintained very low, and, when it is determined that a surge voltage is possibly generated, the surge voltage is prevented from being generated by controlling a current flowing through the capacitors through turning off the surge prevention switches T5 and T6 according to surge prevention switching signals SGV1 to SGVn, or changing resistance values by means of adjustment of angles of the current flows.

The discharging switching unit 131 is composed of one or more semiconductor switches connected in series with respective capacitors of the charging unit 133. Each of the semiconductor switches of the discharging switching unit 131 is turned on according to a control signal input from the main control unit 150 to smooth the unsmoothed DC power output from the rectifying unit 110.

In detail, the discharging switching unit 131 maintains a turn-off state while the capacitors C1 and Cn are charged with the DC power output from the rectifying unit 110. Then, when the voltage of the unsmoothed DC power from the rectifying unit 110 is equal to or smaller than a discharging reference voltage near the zero crossing point of the AC power input to the rectifying unit 110, the discharging switching unit 131 is turned on to instantaneously discharge the power charged in the capacitors C1 and Cn to an output node of the rectifying unit 110.

Then, the power discharged from the capacitors C1 and Cn overlap the DC power output from the rectifying unit 110, and the DC power input to the buck/boost circuit unit 140 has a waveform in which a voltage equal to or smaller than the discharging reference voltage is filled with the voltage discharged from the capacitors C1 and Cn in a voltage waveform of the unsmoothed DC power output from the rectifying unit 110 (see 113 of FIG. 1 and (b) of FIG. 2).

Although the two capacitors are shown in FIG. 2, a person skilled in the art can understand that three or more capacitors can be connected in parallel to compose the charging unit 133, if necessary, in a preferred embodiment of the present invention, and the capacitors can be sequentially discharged one by one as shown in FIG. 2.

After the discharging, the semiconductor element included in the discharging switching unit 131 is turned off again by a control of the main control unit 150, and the capacitors C1 and Cn of the charging unit 133 are charged again by the DC power output from the rectifying unit 110.

In the example in FIG. 2, voltage waveforms are shown which are generated when the charging unit 133 includes three capacitors and the capacitors are sequentially discharged. With reference to FIG. 2, the main control unit 150 can receive the voltage across a resistor R7 through a terminal Vcomp1 to check the voltage across output terminals of the rectifying unit 110, namely, the input terminals of the buck/boost circuit unit 140.

For a reference numeral 310, a voltage value corresponds to 100V that is the discharging reference value, but, judging from the zero crossing point, a voltage of the power input to the buck/boost circuit unit 140 shows an increasing tendency, and thus, the capacitors are not discharged by turning on the discharging switching unit 131.

However, for a reference numeral 320, judging from the zero crossing point, a voltage level of power input to the buck/boost circuit unit 140 shows a decreasing tendency, and a voltage value falls to 100V or smaller, which is a discharging reference value. Accordingly, the main control unit 150 discharges a first capacitor, and when the power charged in the first capacitor is discharged to the output terminal, the waveform of the voltage input to the buck/boost circuit unit 140 rapidly increases as shown by a reference numeral 201.

Meanwhile, the main control unit 150 inspects an output voltage of the buck/boost circuit unit 140, and, when the first capacitor is discharged and the input voltage of the buck/boost circuit unit 140 rapidly increases and then falls to the discharging reference voltage, discharges a second capacitor by outputting a discharge control signal to the discharging switch connected to the second capacitor so as to turn on the switch. When the second capacitor is discharged, the output voltage rapidly increases (see a reference numeral 202).

In the same manner, when the input voltage of the buck/boost circuit unit 140 rapidly increases and then falls to the discharging reference voltage, the main control unit 150 discharges a third capacitor by turning on the discharging switch connected to the third capacitor. When the third capacitor is discharged, the input voltage of the buck/boost circuit unit 140 rapidly increases again (see a reference numeral 203).

After the third capacitor is discharged, a voltage output from the rectifying unit 110 and then input to the buck/boost voltage 140 increases over the discharging reference voltage to charge the capacitors of the charging unit 133 again. Thereafter, the above-described procedure is repeated, and, at the time when the voltage of the output terminal (the input terminal of the buck/boost circuit) of the rectifying unit 110 falls below the discharging reference voltage, the first to third capacitors are sequentially discharged and a voltage equal to or greater than the discharging reference voltage is input to the buck/boost circuit unit 140, as shown in reference numerals 211, 212, 213, 221, 222, and 223.

The buck/boost circuit unit 140 steps down or boosts the smoothed DC power received in the discharging and switching procedure according to a control signal input from the main control unit 150, and provides the stepped down or boosted voltage to the load.

The data receiving unit 160 receives data for instructing a specific function or data for instructing to start an operation of the rectifying device of the present invention or the entire electronic device including the rectifying device of the present invention from an external device (an external sensor, a remote controller, a control device, a control server, or the like interworking with the rectifying device of the present invention), and outputs the received data to a shift register 170 and the main control unit 150. The data receiving unit 160 is designed to be insulated from the external device so as not to be electrically influenced by the external device.

The shift register 170 internally stores an operation start code and an operation end code, and checks whether data input from the data receiving unit 160 matches the operation start code or the operation end code. When the input data matches the operation start code, a standby power switch T4 included in an operation switching unit 190 is turned on to allow the entire rectifying device to operate, and when the input data matches the operation end code, the standby power switch T4 included in the operation switching unit 190 is turned off to allow the entire operation of the rectifying device to end.

The data transmission unit 180 transmits data received from the main control unit 150 to an external device interworking with the rectifying device of the present invention. Like the data receiving unit 160, the data transmission unit 160 is also designed to be insulated from the external device so as not to be electrically influenced by the external device.

The operation switching unit 190 connects or disconnects the earth ground GND and an analog ground AGND according to a control from the shift register 170 to allow the entire elements of the rectifying device of the present invention to operate or end the operations.

Specifically, with reference to FIG. 1, when an operation start control signal is input from the shift register 170, the standby power switch T4 is turned on, and a current that has flowed through a resistor R9 from VDD to a SHUT terminal of the main control unit 150 is made to flow to the earth ground GND through the standby power switch T4. Accordingly, a turn on switch T3 implemented with a PNP bipolar transistor is turned on to allow the voltage across a resistor R15 to turn on a switch T7 installed between the earth ground GND and the analog ground AGND, which connects the earth ground GND with the analog ground AGND to operate elements connected to the analog ground AGND.

Meanwhile, the main control unit 150 entirely controls the functions of the elements. Specifically, the main control unit 150 checks, from the voltage value input from the SHUT terminal, whether the turn on switch T4 is turned on to start the entire operation of the rectifying device, and, when the entire rectifying device is started, operates the buck/boost circuit unit 140 to supply power to the load. Here, the main control unit 150 receives the voltage across a resistor R4 through a terminal Vcomp2 to measure the output voltage of the buck/boost circuit unit 140, and receives the voltage across a resistor Rcs through a terminal CS to measure a current flowing to the load and control an operation (the voltage stepping down or voltage boosting) of the buck/boost circuit 140.

In addition, the main control unit 150 can receive the voltage across the resistor Rcs connected in series to the load through the CS terminal to sense the current flowing to the load. When an overcurrent flows to the load, the main control unit 150 can stop the operation of the buck/boost circuit unit 140 to cut off the current flowing to the load, accordingly protect a load circuit and a surrounding circuit, and transmit this fact to an external device through the data transmission unit 180.

In addition, the main control unit 150 measures voltage values, which are charged in the capacitors C1 and Cn of the charging unit 133, from the voltages input through terminals CG1 and CGn to inspect whether a surge voltage is generated, and receives zero crossing point information ZCD about the AC power from the rectifying unit 110.

The main control unit 150 checks an input voltage currently input to the buck/boost circuit unit 140 using a voltage value input through the Vcomp2 terminal, and, when the input voltage is equal to or smaller than the discharging reference voltage around the zero crossing point, outputs a discharging control signal to the discharging switch unit 131 through terminals DS1 and DSn to turn on one or more discharging switches included in the discharging switch unit 131. Accordingly, the power charged in the capacitors is instantaneously discharged to overlap the DC power output from the rectifying unit 110, and then is smoothed.

While the charging and discharging unit 130 repeats the charging and discharging procedures, when the voltage values input through the CG1 and CGn terminals increase over the reference voltage, the main control unit 150 determines that the surge voltage is highly likely to be generated, and outputs a surge prevention control signal through SGV1 and SGVn terminals to turn off the surge prevention switches T5 and T6, or to adjust the resistances of the surge prevention switches T5 and T6 through SGV1 and SGVn terminals. In other words, the resistances of the surge prevention switches T5 and T6 are adjusted by adjusting the voltages output to the surge prevention switches T5 and T6 through the SGV1 and SGVn terminals so as to correspond to the voltage values input through the CG1 and CGn terminals, and thus, the charging voltages or the discharging voltages of the capacitors are adjusted. Such a surge prevention function will be described in detail with reference to FIGS. 4 and 5.

The main control unit 150 can receive data through an RX terminal via the data receiving unit 160 from the external device to execute an instruction indicated by the data. In addition, the main control unit 150 can transmit data to the external device through the data transmission unit 180.

Figure 3A:
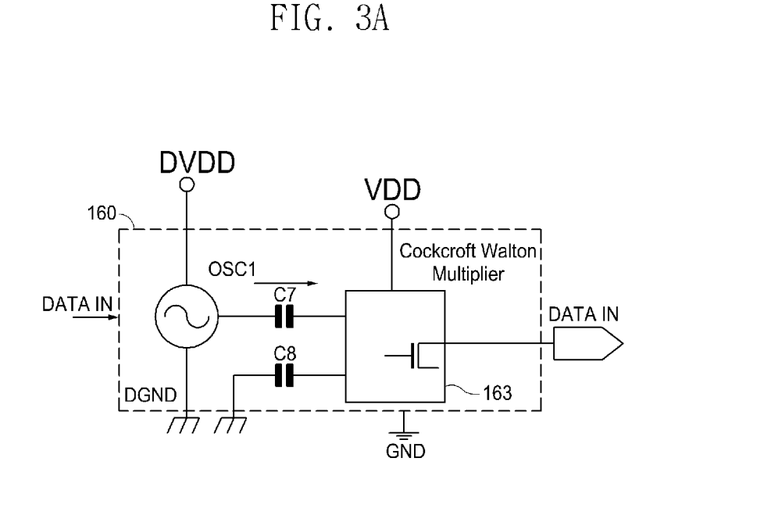
FIG. 3A specifically illustrates the configuration of a data receiving unit according to a preferred embodiment of the present invention.
Figure 3B:
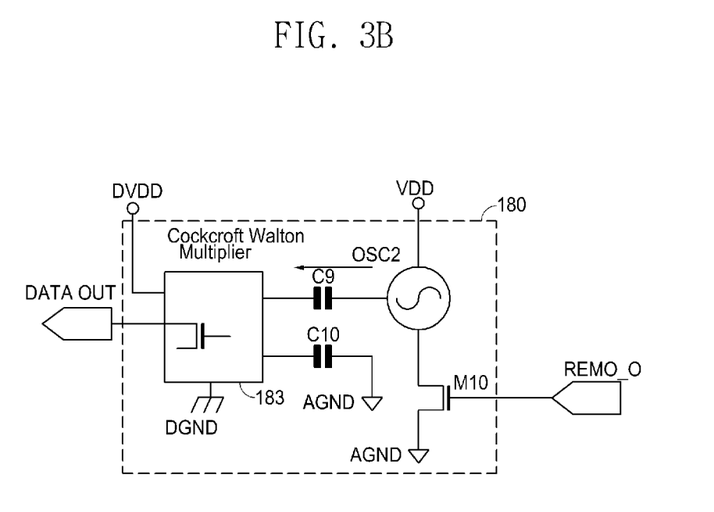
FIG. 3B specifically illustrates the configuration of a data transmission unit according to a preferred embodiment of the present invention.
Figure 3C:
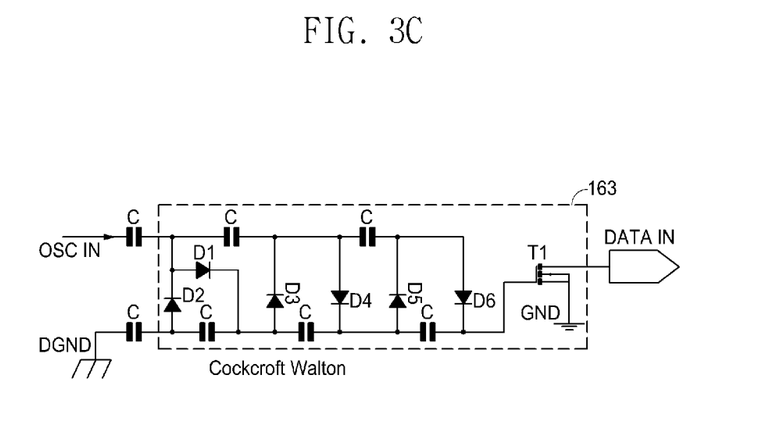
FIG. 3C illustrates an example of each voltage multiplication circuit included in the data receiving unit and the data transmission unit according to a preferred embodiment of the present invention.

FIG. 3A specifically illustrates the configuration of the data receiving unit 160 according to a preferred embodiment of the present invention, FIG. 3B illustrates the configuration of the data transmission unit 180 according to a preferred embodiment of the present invention, and FIG. 3C illustrates an example of voltage multiplication circuits 163 and 183 included in the data receiving unit 160 and the data transmission unit 180 according to a referred embodiment of the present invention.

With reference to FIG. 3A first, when data DATA IN is received from the external device, the data receiving unit 160 of the present invention drives an oscillator according to the received data to input data to the voltage multiplication circuit 163, and the voltage multiplication circuit 163 performs voltage doubling on a signal input through the oscillator to output the corresponding signal to the shift register 170 and the main control unit 150. The voltage multiplication circuit 163 according to a preferred embodiment of the present invention can be implemented the well-known Cockroft Walton circuit as shown in FIG. 3C.

Furthermore, the data transmission unit 190 illustrated in FIG. 3B receives the data output from the main control unit 150 to drive an internal oscillator, the oscillator oscillates a frequency signal according to the data input from the main control unit, and, like the data receiving unit 160, the voltage of the oscillated frequency signal is boosted through the voltage multiplication unit 163 to be transmitted to the external device. The voltage multiplication circuit 183 used in the data transmission unit 180 can also be implemented the well-known Cockroft Walton circuit as shown in FIG. 3C.

Figure 4:
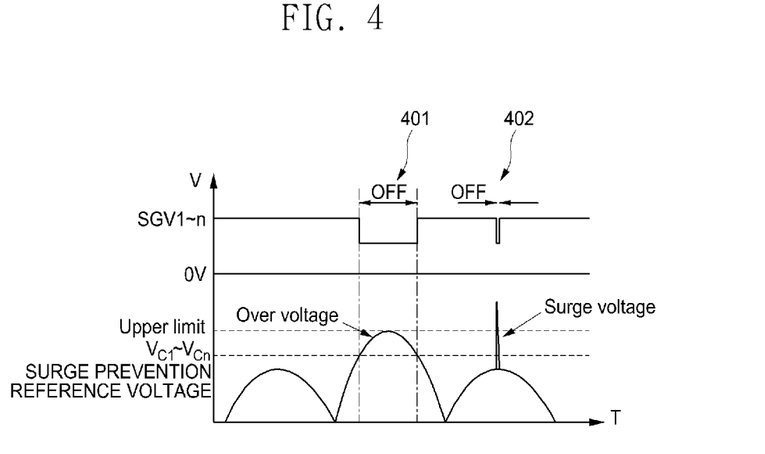
FIG. 4 illustrates a concept of preventing a surge voltage according to a preferred embodiment of the present invention.

FIG. 4 illustrates a concept of preventing a surge voltage according to a preferred embodiment of the present invention.

With further reference to FIG. 4, the present invention measures voltages of the capacitors C1 and Cn composing the charging unit 133 to check whether there is a concern about generation of the surge voltage, and according thereto, the resistances of the surge prevention switches T5 and T6 are adjusted to control the currents flowing through the capacitors. And thus, the surge voltage, in particular, a surge voltage caused by an inrush current, is prevented from being actually generated.

As illustrated in FIG. 1, the main control unit 150 can know the voltages across the capacitors by measuring the voltages across resistors R19 and R17 of a voltage divider connected in parallel to the capacitors C1 and Cn.

In the scheme illustrated in FIG. 4, in periods 401 and 402 in which the voltages Vc1 and Vcn across the capacitors are equal to or greater than the surge prevention reference voltage defined in advance, the capacitors C1 and C2 and the surge prevention switches T5 and T6 are turned off to control the current not to flow through the surge prevention switches T5 and T6, and thus prevents the high surge voltage from being generated at the time of charging and discharging the capacitors. In particular, at the time of discharging the capacitors, generation of the high surge voltage caused by the inrush current is prevented.

Figure 5:
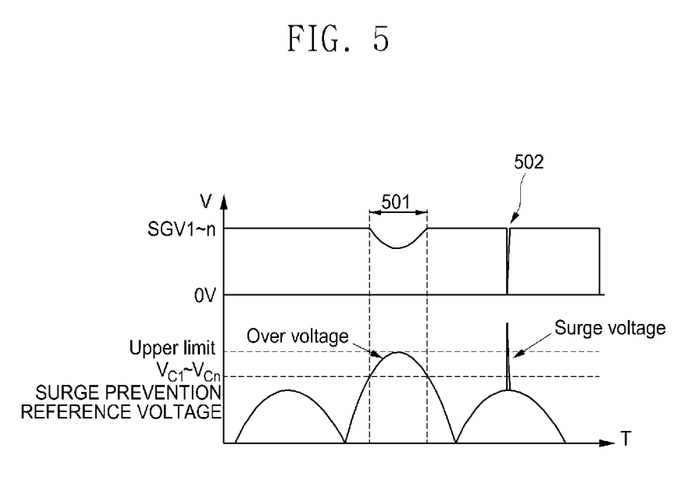
FIG. 5 illustrates a concept of preventing a surge voltage according to another preferred embodiment of the present invention.

FIG. 5 illustrates a concept of preventing a surge voltage according to another preferred embodiment of the present invention.

In the example illustrated in FIG. 4, while the voltages across the capacitors are equal to or greater than the surge prevention reference voltage, the surge prevention switches T5 and T6 are turned off. However, in the embodiment illustrated in FIG. 5, the surge voltage is prevented from being generated by increasing resistance values in proportional to the amounts that the voltages across the capacitors exceed the surge prevention reference voltage.

For example, when the surge prevention switches T5 and T6 are implemented with triac switches, the main control unit 150 outputs voltages to the gates of the triac switches inversely proportional to the amounts that the voltages across the capacitors c1 and cn exceed the reference voltage, and thus prevents the generation of the surge voltage by reducing the amounts of the currents flowing through the triac switches.

In the example illustrated in FIG. 5, while the voltages across the capacitors are equal to or smaller than the reference voltage, the voltages, which are output from the main control unit 150 through SGV1 to SGVn terminals to the gates of the surge prevention switches T5 and T6, completely turn ON the surge discharge switches.

For periods 501 and 502 in which the voltages across the capacitors are equal to or greater than the reference voltage, voltages inversely proportional to a voltage equal to or greater than the reference voltage are output to the gates of the surge prevention switches T5 and T6 through the SCV1 and SGVn terminals in the main control unit 150, the resistance values of the surge prevention switches are adjusted to adjust current amounts flowing through the surge prevention switches, and thus the generation of the surge voltage can be prevented.

Figure 6:
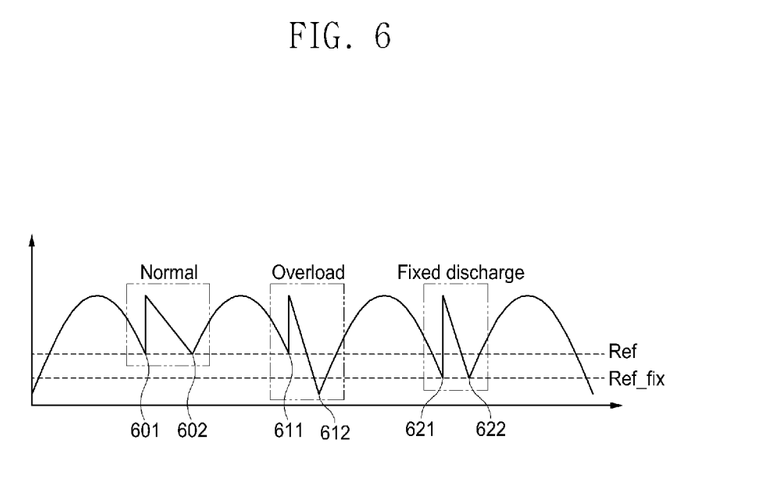
FIG. 6 illustrates a DC smoothing scheme according to another preferred embodiment of the present invention.

FIG. 6 illustrates a DC smoothing scheme according to another preferred embodiment of the present invention.

With reference to FIG. 6, when the load of the present invention is a typical load, the main control unit 150 turns on the discharge switches 131 to perform smoothing, when the voltage output from the rectifying unit 110 reaches a discharge reference voltage ref. Then, as shown in FIG. 6, a minimum value of the smoothed voltage is equal to or greater than the discharge reference voltage value Ref like reference numerals 601 and 602, and thus the voltage of the output terminal of the rectifying unit 110 is smoothed to be equal to or greater than the discharge reference voltage Ref.

However, in case where the load supplied with the power is overloaded, even through the discharge switches 131 are turned on to smooth the voltage at the time when the voltage output from the rectifying unit 110 reaches the discharge reference voltage ref (see a reference numeral 611), the current of the capacitor is discharged too fast. Accordingly, as a reference numeral 612 shows, the voltage of the output terminal of the rectifying unit 110 falls close to 0V right after the capacitors are entirely discharged, and thus imperfect voltage smoothing may be performed.

Accordingly, in another preferred embodiment of the present invention, the main control unit 150 outputs a discharge control signal to the discharging switch unit 131 to entirely discharge power charged in the charging unit 133 to the output terminal of the rectifying unit 110, and then a discharge timing is adjusted so as to allow uniform voltage smoothing to be performed, if the voltage of the output terminal of the rectifying unit 110, which is input through the Vcomp1 terminal, falls further than the discharge reference voltage Ref like a reference numeral 612.

To this end, after the power charged in the charging unit 133 is entirely discharged, when the voltage of the output terminal of the rectifying unit 110 falls under the discharge reference voltage value Ref, the main control unit 150 determines overload. The main control unit 150 calculates the average of the reference voltage value Ref and the minimum voltage value 612 of the output terminal of the rectifying unit 110 after the discharge of the charging unit 133 is completely performed, re-sets the discharge reference voltage value Ref fix, and adjusts the discharge timings of the discharge switches 131 so that the capacitors included in the charging unit 133 are discharged at the Ref fix.

Hereinafter, the operation procedure of the rectifying device according to a preferred embodiment of the present invention will be sequentially described with reference to FIGS. 1 to 6.

First, the rectifying unit 110 receives the external AC power, rectifies the received AC power to output unsmoothed DC power, and detects the zero crossing point at which the external AC power becomes 0 to output the detected point to the main control unit 150. The unsmoothed DC power has a waveform (see (a) of FIG. 2) represented as a reference numeral 111 of FIG. 1.

The power management unit 120 generates the voltage VDD using the DC power output from the rectifying unit 110, and outputs the voltage VDD to the shift register 170, the data receiving unit 160, the data transmission unit 180, and the main control unit 150 to drive the corresponding elements.

The unsmoothed power output from the rectifying unit 110 is in a state of being delivered to the input terminal of the buck/boost circuit unit 140, and when the data from the external device (an external sensor, a remote controller, a control device, a control server or the like interworked with the rectifying device of the present invention) is received by the data receiving unit 160, the data receiving unit 160 outputs the received data to the control unit 150 and the shift register 170.

As described above, the data receiving unit 160 can be implemented using the voltage multiplication circuit 163 such as the Cockcroft Walton so that the standby power device of the present invention can be driven even only with a small amplitude signal, while the external device is insulated from the standby power device.

The shift register 170 compares the data input from the data receiving unit 160 with the data (namely, the operation start code for instructing to operate the rectifying device) stored in advance, and when the data input from the data receiving unit 160 matches the stored data, the turn on signal for operating the rectifying device is output to the standby power switch T4.

When the standby power switch T4 is turned on, the current, which is input to the SHUT terminal of the main control unit 15 through the resistor R9 from VDD, flows to the earth ground GND through the standby power switch T4. Accordingly, the turn on switch T3, which is implemented with the PNP bipolar transistor, is turned on and the voltage across the resistor R15 turns on the switch T7 installed between the earth ground GND and the analog ground AGND to connect them to each other, and thus the elements connected to the analog ground are operated.

Then, the unsmoothed power output from the rectifying unit 110 charges the capacitors C1 and Cn of the charging unit 133 through the diode D2 to Dn.

Thereafter, in a period in which the DC power 111 is equal to or smaller than the discharge reference voltage around the zero crossing point, the main control unit 150 turns on the discharge switches 131 using the zero crossing point information output from the rectifying unit 110 to discharge the voltages stored in the charging unit 133 to smooth the DC power 111 output from the rectifying unit 110.

To this end, the main control unit 150 sequentially turns on the plurality of discharge switches 131 included in the charging unit 133 around the zero crossing point to discharge the voltages charged in the capacitors C1 and Cn connected in series to respective switches. The discharged voltages overlap the voltage output from the rectifying unit 110 to fill the low voltage period, and, accordingly, an effect of substantially smoothing the rectified voltage is produced without using an electrolytic capacitor.

In addition, the DC power 113 smoothed by the discharge voltage of the charging unit 133 is stepped down or boosted through the buck/boost circuit unit 140 to be provided to the load. The main control unit 150 receives the output voltage value of the buck/boost circuit unit 140 through the voltage across the voltage divider, receives a value of the current flowing to the load through the voltage across the current sensing resistor Rcs connected in series to the load, and controls the buck/boost circuit unit 140 to control the voltage and current input to the load.

Here, such a typical state is a state in which the surge voltage is not generated, and, accordingly, the surge prevention switches T5 and T6 are in the turn-on state.

Meanwhile, in a procedure in which such operations are repeated, the main control unit 150 receives the voltages across the surge sensing resistors R17 and R19 to continuously inspect whether the surge voltage is generated in the charging and discharging procedures, and, when the voltage across the surge sensing resistor rapidly increases over the surge prevention reference voltage, the surge voltage is determined to be generated, the surge prevention switches T5 and T6 connected in series to the capacitors C1 and Cn of the charging unit 133 are turned off, or the resistances of the surge prevention switches are adjusted through the control for the angles of current flows to adjust the resistances of the surge prevention switches and prevent the surge voltage from being generated in the charging and discharging procedures. The scheme for controlling the surge prevention switches T5 and T6 in order to prevent the generation of the surge voltage was described with reference to FIGS. 1 to 5, and thus the detailed description thereabout will be omitted.

Until now, preferred embodiments of the present invention are described mainly. It will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A rectifying device comprising:
   a rectifying unit for rectifying AC power to output unsmoothed DC power;
   a buck/boost circuit unit for receiving the DC power from an output terminal of the rectifying unit to boost or step down the DC power according to a control signal input from a main control unit, and providing the boosted or stepped down voltage to a load;
   a charging and discharging unit charged with the unsmoothed DC power, and for generating smoothed DC power by discharging the charged power to the output terminal of the rectifying unit to be overlapped with the unsmoothed DC power according to a discharge control signal input from the main control unit, when a voltage of the unsmoothed DC power is equal to or smaller than a reference voltage;
   a data receiving unit for receiving data from an external device to output the data to a shift register;
   the shift register for outputting an operation start signal, when the data input from the data receiving unit matches an operation start code;
   an operation switching unit for driving the charging and discharging unit and the main control unit, when the operation start signal is input; and
   the main control unit for controlling the buck/boost circuit unit to boost or step down the input DC power to output the boosted or stepped-down voltage to the load, receiving a zero crossing point of the AC power from the rectifying unit, outputting the discharge control signal to the charging and discharging unit to discharge the charging and discharging unit, when the unsmoothed DC voltage is equal to or smaller than a discharge reference voltage around the zero-crossing point.

2. The rectifying device of claim 1, wherein the charging and discharging unit comprises:
   a discharge switching unit including one or more discharge switches connected to the output terminal of the rectifying unit and to be turned on or off according to the discharge control signal; and
   a charging unit comprising:
      one or more capacitors connected in series to the one or more discharge switches, charged with the unsmoothed DC power, and discharged when the one or more discharge switches are turned on; and
      surge prevention switches respectively connected in series to the capacitors,
   wherein resistances of the surge prevention switches are controlled according to a surge prevention signal input from the main control unit.

3. The rectifying device of claim 2, wherein the main control unit turns OFF the surge prevention switches to prevent a surge voltage from being generated, while a voltage or voltages across the one or more capacitors is or are equal to or greater than a surge prevention reference voltage.

4. The rectifying device of claim 2, wherein the main control unit prevents a surge voltage from being generated by increasing resistance values of the surge prevention switches in proportion to an amount that a voltage or voltages across the one or more capacitors exceeds or exceed a surge prevention reference voltage while the voltage or voltages across the one or more capacitors is equal to or greater than the surge prevention reference voltage.

5. The rectifying device of claim 4, wherein the surge prevention switches are implemented with triac switches, and the main control unit outputs a voltage inversely proportional to an amount that the voltage or voltages across the one or more capacitors exceeds or exceed the surge prevention reference voltage, to the triac switches to increase resistance values of the surge prevention switches so as to prevent the surge voltage from being generated.

6. The rectifying device of claim 1, wherein the operation switching unit drives the charging and discharging unit and the main control unit by connecting an earth ground and an analog ground, when the operation start signal is input from the shift register.

7. The rectifying device of claim 1, further comprising:
a power management unit for generating a driving voltage VDD using the DC power output from the rectifying unit, and outputting the driving voltage VDD to drive the shift register, the data receiving unit, and the main control unit.

8. The rectifying device of claim 1, wherein the data receiving unit comprises:
an oscillator driven according to data received from the external device to generate a signal corresponding to the received data; and
a voltage multiplication circuit for amplifying the signal output from the oscillator to output the amplified signal to the shift register and the main control unit.

9. The rectifying device of claim 1, wherein the main control unit resets an average value of the discharge reference voltage value and a minimum voltage value of the output terminal, which is smaller than the discharge reference voltage, as the discharge reference voltage value, when the voltage of the output terminal of the rectifying unit falls below the discharge reference voltage right after outputting the discharge control signal to the charging and discharging unit to entirely discharge the power charged in the charging and discharging unit to the output terminal of the rectifying unit, and adjusts a discharge timing so that discharging of the charging and discharging unit is performed at the reset discharge reference voltage value.

10. The rectifying device of claim 1, wherein the main control unit senses a current flowing through the load from a voltage across a resistor connected in series to the load, and stops the operation of the buck/boost circuit unit when an overcurrent flows to the load.

* * * * *